June 20, 1961    L. J. KNUDSEN    2,988,822
SEMAPHORE AND MORSE CODE EDUCATIONAL DEVICE
Filed Feb. 9, 1959    4 Sheets-Sheet 1

INVENTOR.
LOWELL J. KNUDSEN

BY

AGENT

June 20, 1961  L. J. KNUDSEN  2,988,822
SEMAPHORE AND MORSE CODE EDUCATIONAL DEVICE
Filed Feb. 9, 1959  4 Sheets-Sheet 2

INVENTOR.
LOWELL J. KNUDSEN
BY
*Louis J. Knobbe*
AGENT

*INVENTOR.*
LOWELL J. KNUDSEN
BY
*Louis J. Knobbe*
AGENT

June 20, 1961    L. J. KNUDSEN    2,988,822
SEMAPHORE AND MORSE CODE EDUCATIONAL DEVICE
Filed Feb. 9, 1959    4 Sheets-Sheet 4

INVENTOR.
LOWELL J. KNUDSEN
BY
*Louis J. Knobbe*
AGENT

United States Patent Office 2,988,822
Patented June 20, 1961

2,988,822
SEMAPHORE AND MORSE CODE
EDUCATIONAL DEVICE
Lowell J. Knudsen, 14414 Calpella St., La Mirada, Calif.
Filed Feb. 9, 1959, Ser. No. 791,954
6 Claims. (Cl. 35—14)

This invention relates to an educational device and more particularly to a device for teaching semaphore and Morse code signals.

The semaphore and Morse code signals are either required to be learned or are of particular benefit in several professions and avocations. A list by no means complete includes Navy and Coast Guard personnel, amateur radio operators, and Boy Scouts. Although this invention is of use to anyone learning the semaphore and Morse signals, it has been found to have particular utility in teaching Boy Scouts these signals so that they may qualify for the Signaling Merit Badge.

A primary advantage of the present invention not obtainable with any device presently available is that it provides realism within an inexpensive device. Thus, while learning the semaphore code signals, individual replica flags are rotated in the same manner as the signal flags are rotated in actual use. In learning the Morse code, a continuous flow of coded information is available for the student to practice upon. It is this realistic form of operation that is believed to enable boys to quickly and easily learn the semaphore and Morse code signals. Heretofore, the devices available for teaching these signals have all failed to provide this realistic mode of operation unless they were made with considerable complexity with resultant high cost.

Accordingly, it is an object of this invention to provide an improved semaphore and Morse code education device.

It is also an object of this invention to provide a semaphore and Morse code educational device having a very realistic mode of operation.

It is another object of this invention to provide an improved, yet inexpensive semaphore and Morse code educational device.

It is an additional object of this invention to provide a semaphore code educational device in which individual replica flags may be rotated.

Another object of this invention is to provide a Morse code educational device in which a continuous flow of coded information is available.

A further object of this invention is to provide a Morse code educational device which efficiently utilizes space so as to provide a maximum number of practice letters.

Other and further objects, features and advantages of the invention will become apparent from the following description taken in connection with the accompanying drawings, in which.

Figure 1:
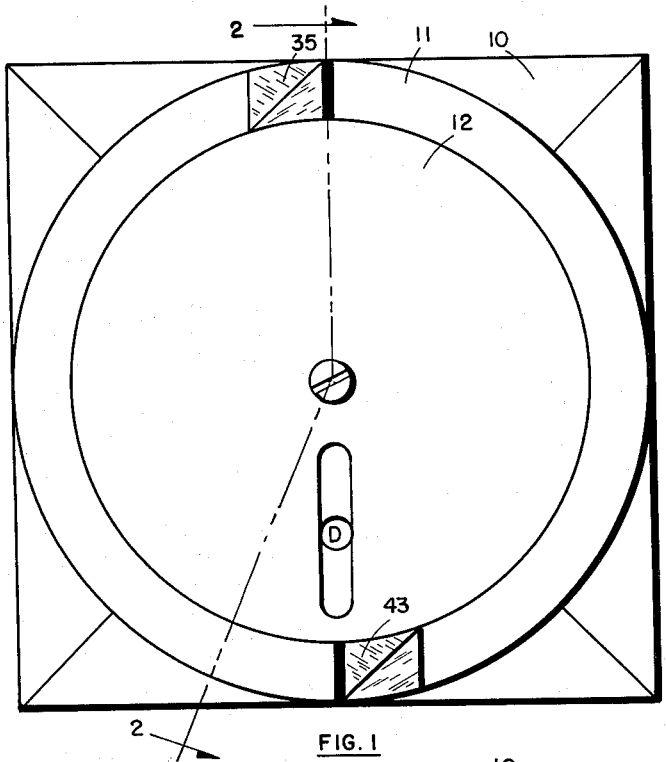
FIG. 1 is a front view of the assembled device.
Figure 2:
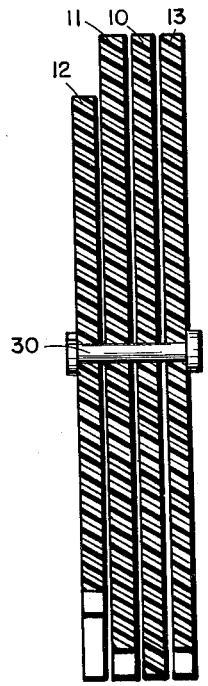
FIG. 2 is a vertical section along the line 2—2 in FIG. 1.
Figure 8:
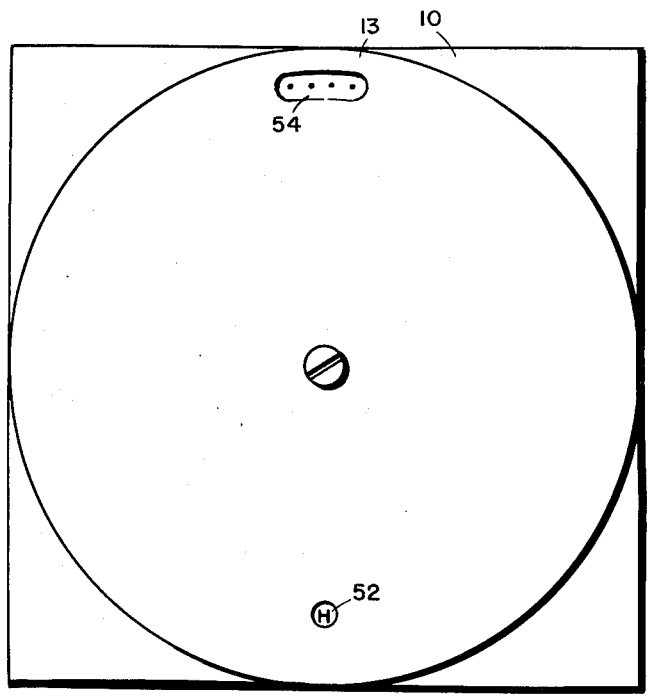
FIG. 8 is a back view of the assembled device.

Referring now to FIG. 1, the semaphore instructor appears on one side of the device denoted as the front view. Seen from this side are the base element 10 and discs 11 and 12. The Morse code instructor appears on the opposite or reverse side of the device and comprises as shown in FIG. 8 the base element 10 and disc 13. In these figures, as in the others, all elements are shown full scale of a particular embodiment of this invention. Each member forming this device may suitably be made of any sufficiently strong and durable sheet material. Cardboard or opaque or semi-opaque plastic material will ordinarily be preferred. The base member and discs, as best shown in FIG. 2, are secured together in concentric relation by means of a threaded bolt or rivet 30 so that the discs may each be rotated with respect to the others.

Figure 3:
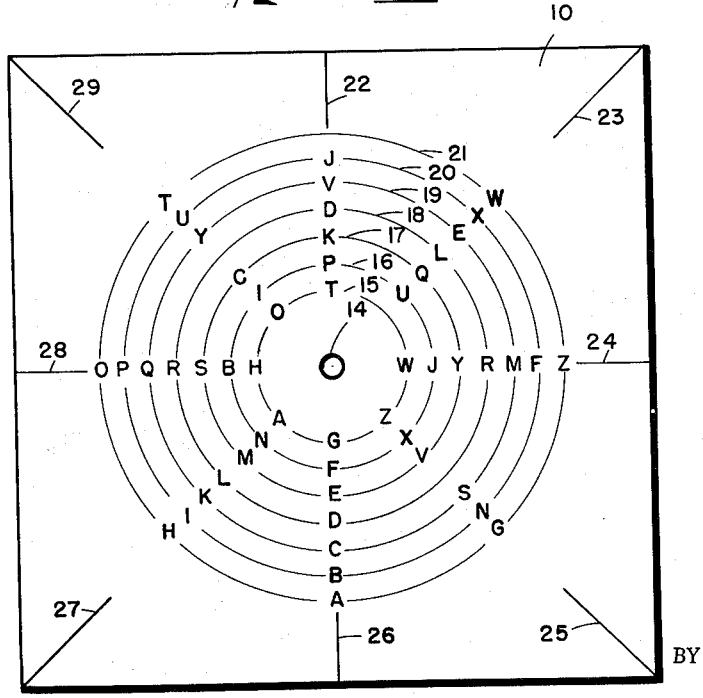
FIG. 3 is a front view of the device with the rotatable discs removed.
Figure 4:
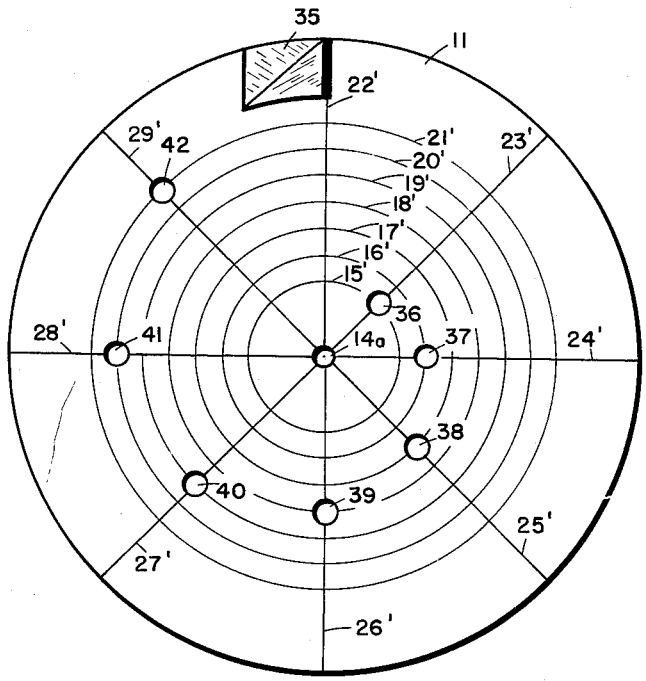
FIG. 4 is a face view of one of the rotatable discs of the device.

The front face of the base members, i.e., the face forming part of the semaphore teaching device, carries a plurality of alphabet letters and spaces located at the intersection of concentric circles 15, 16, 17, 18, 19, 20 and 21 and radial lines 22, 23, 24, 25, 26, 27, 28 and 29 as is shown in FIG. 3. Each of these radial lines are located at 45° intervals about the center 14 and each of the concentric circles 15 through 1 are concentric with the center 14. Thus, for example, at the intersection of circle 15 with radial line 22, there is located the alphabet character T, at the intersection of circle 15 with radial lines 23 there is located a space, and at the intersection of circle 15 with radial line 24 there is located the alphabet letter W. The various circles 15 through 21 are shown in FIG. 4 for clarity of description and need not be included in the finished semaphore device. The retention of the radial lines 22 through 29 is to be preferred as an aid to positioning the semaphore flags as described below.

Referring now to FIG. 4, there is shown disc 11, one of the two discs forming the semaphore teaching device. This disc includes center opening 14a adapted for mounting the disc upon the retaining member 30 thereby allowing this disc to be rotated with respect to the base element 10. Shown also on the disc 11 are a plurality of circles 15', 16', 17', 18', 19', 20', and 21' corresponding in location and dimensions with the circles 15 through 21 located upon the base element 10 as shown in FIG. 3. Likewise a plurality of radial lines 22', 23', 24', 25', 26', 27', 28', and 29' are shown upon the disc corresponding in location with the radial lines 22 through 29 shown upon the base element 10 in FIG. 3. At the intersection of radial line 23' and circle 15' is located a circular aperture 36. At the intersection of radial line 24' and circle 16' is located a circular aperture 37. At the intersection of radial line 25' with circle 17' is located a circular aperture 38. At the intersection of radial line 26' with circle 18' is located a circular aperture 39. At the intersection or radial line 27' with circle 19' is located a circular aperture 40. At the intersection of radial line 28' with circle 20' is located a circular aperture 41. And at the intersection of radial line 29' with circle 21' is located circular aperture 42. It will be observed that the circular apertures 36, 37, 38, 39, 40, 41, and 42 are located along a spiral curve. Each of these circular apertures is similar in dimensions with the alphabet letters carried by the base element 10 shown in FIG. 3, i.e. no more than one alphabet letter may be exhibited through each of the circular apertures at any one time. A representation of a semaphore flag 35 is carried by disc 11 adjacent its peripheral edge and is located so that the portion of the radial line 22' forms the flag's staff. The circles 15' through 21' and radial lines 22' through 29' shown in FIG. 4 are for clarity of description and need not be included in the finished semaphore instruction device.

In this specification, the term aperture is used in the broadest sense and includes not only the physical openings shown in the several discs, but other transparent means for permitting the base member to be seen through one or more of the discs mounted thereon. Thus, another embodiment of the invention (not shown) could utilize generally opaque plastic discs having transparent windows wherever an aperture is required.

Figure 5:
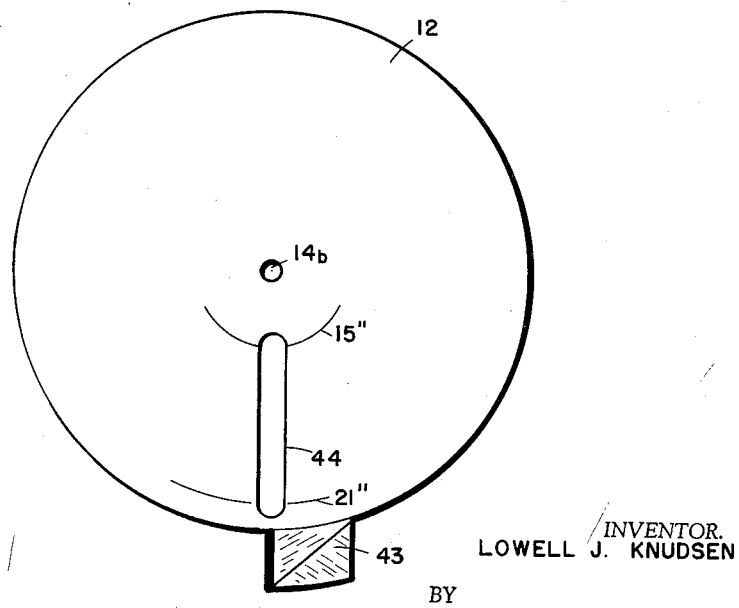
FIG. 5 is a face view of another rotatable disc of the device.

Disc 12 of the semaphore device is shown in FIG. 5. This disc includes a centrally located mounting aperture 14b adapted for mounting upon the mounting element 30. A representation of a semaphore flag 43 is carried by disc 12 extending beyond its outer circular peripheral edge. Along the radial line formed by the staff of flag 43 there is located a slot 44. Slot 44 is of sufficient longitudinal dimension that, if the disc 12 were placed over the base element 10, an entire radial row of alphabet characters and/or spaces would be exhibited through the slot. Stated in another way, as shown in FIG. 5 the slot is of somewhat lesser dimensions than circle 15″ and of somewhat longer radial dimension than the circle 21″, the circles 15″ and 21″ corresponding in location and dimension with respective circles 15 and 21 located upon the base element 10. These circles 15″ and 21″ are shown for clarity of description and need not be included in the finished device. The width of the slot 44 is the same as the diameter of the circular apertures 36 through 42 located in disc 11 as shown in FIG. 4. As shown in FIGS. 1 and 2, the disc 12 has a smaller diameter than disc 11 so as to permit the flag 35 on disc 11 to be seen when disc 12 is mounted over disc 11.

The operation of the semaphore educational device is as follows:

Initially, let us assume that only the disc 11 shown in FIG. 4 is rotatably mounted upon the base element 10 shown in FIG. 4. When the disc 11 is rotated so as to superimpose respective radial lines 22 through 29 of base element 10 with radial lines 22′ through 29′ of disc 11, a single alphabet letter or space will be exhibited through the circular apertures 36 through 42. Thus, for example, if radial line 22′ of disc 11 is superimposed upon radial line 22 of base element 10, a space will be observed through circular aperture 36, a J will be observed through circular aperture 39, a V will be observed through circular aperture 38, a D will be observed through circular aperture 39, a K will be observed through circular aperture 40, a P will be observed through circular aperture 41, and a T will be observed through circular aperture 42. With the disc so orientated with respect to the base element 10, the semaphore flag 35 is positioned vertically. Each of the alphabet letters seen through the circular apertures corresponds to a particular orientation of the two semaphore flags in which one of the semaphore flags is held in a vertical position. Thus, for example, when both semaphore flags are opposite each other in a vertical configuration, the letter D is denoted. If the disc 12 is now rotatably mounted upon the disc 11 and base element 10, it may be noted that when the flag 35 is allowed to remain along the radial line 22 of base element 10 and the staff of flag 43 of disc 12 is orientated along the radial line 26 of base element 10, the flags are in the position described; namely opposite each other in vertical position, and the only alphabet character now observable is the letter D seen through slot 44 of disc 12. The remaining alphabet letters exhibited through the other circular apertures of disc 11 are no longer exhibited through the opaque or semi-opaque disc 12. This particular orientation of the signal flaps is shown in FIG. 1. In like manner, the alphabet letters and spaces carried by the base element 10 as shown in FIG. 4 are selected so as to provide all 26 alphabet letters in the semaphore code as the signal flags 35 and 36 are moved relative with respect to each other. For ease in locating the signal flags at precisely 45° intervals, the staff of the flags may be aligned with the radial lines 22 through 29 carried by the base element 10.

It will thus be seen that this device provides for selecting from a plurality of different radial rows or groups of letters, a single letter corresponding to the spatial orientation of the two discs relative to each other. This function is accomplished by adapting one of the discs (disc 11) to exhibit particular letters from a plurality (7) of the eight radial rows of letters on the base member, and adapting the other disc 12 to exhibit all the letters in only a single radial row. The combination of these elements accomplishes the proper selection of alphabet letters for all code positions of the discs.

From the foregoing described operation it may be observed that my invention provides a very realistic device for learning the semaphore code. Each of the signal flags may be moved independent of the other exactly as in the actual use of the flags. Thus, there is provided an endless variety of ways in which the flags may be positioned and no preset order of flag patterns is incorporated in the device. This of course is of advantage to the student because he does not then rely on the sequence of the flags in order to identify them. Combined with this realistic operation is the simplicity of my invention incorporating a single printed element and two discs rotatably mounted thereon.

Figure 6:
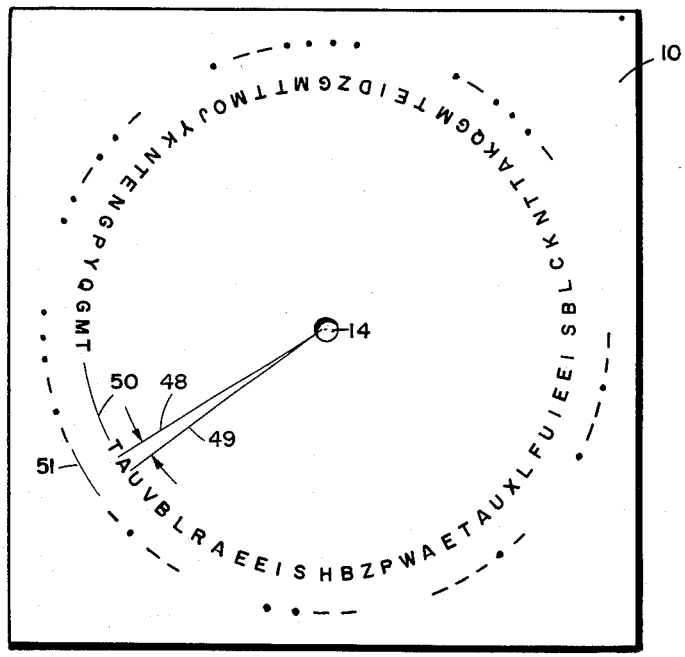
FIG. 6 is a back view of the device with the rotatable discs removed.
Figure 7:
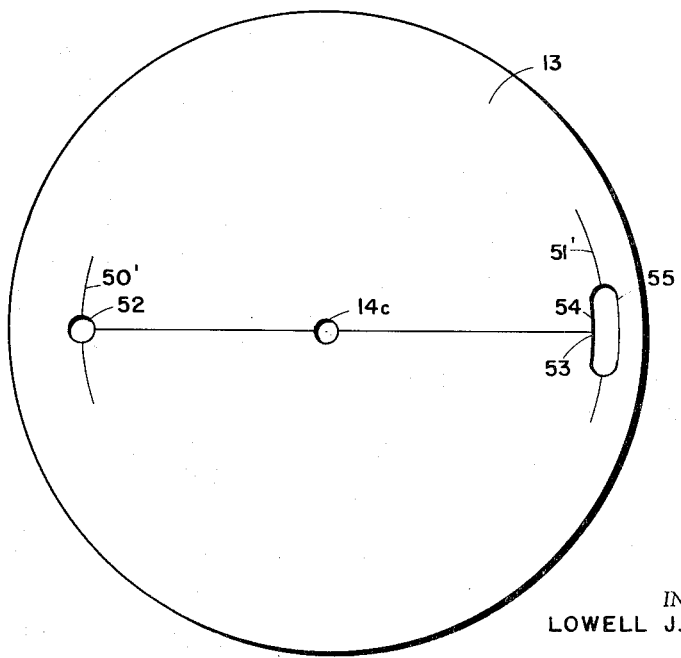
FIG. 7 is a face view of still another of the rotatable discs of the device.

The Morse code educational device is shown in FIGS. 6, 7, and 8. Referring now to FIG. 6, there is shown the reverse or back side of the base element 10. Located in a circular path 50 are a plurality of alphabet letters sequentially arranged in a predetermined manner. These letters are regularly spaced with respect to the center 14. In the particular embodiment shown the angular spacing of each of these letters as denoted by radial lines 48 and 49 is 5°.

Also carried on this face of base element 10 in a circular path 51 are a plurality of spaces, dots and dashes sequentially arranged in a predetermined manner. These spaces, dots and dashes are likewise regularly spaced with respect to the center 14 and with the same angular displacement as the alphabet letter (5° in the embodiment shown). These spaces, dots and dashes are so positioned that a plurality of different alphabet letters may be derived from a minimal number of dots and dashes. Stated in another way, the dots and dashes are so arranged that two or more alphabet letters may be derived with some of the same dots and dashes common to both. Each of the circular paths 50 and 51 are concentric with the central aperture 14. Shown in FIG. 7 is the disc 13 having a central aperture 14c adapted for mounting on element 30 as shown in FIG. 2. A circular aperture 52 is formed in disc 13 at a distance from the center of the disc corresponding to the radius of the circular path 50 shown in FIG. 6 (shown as circle 50′ in FIG. 7). At the intersection of the diameter defined by the center 14c and circular aperture 52, and the circular path 51′ corresponding to the circular path 51 shown in FIG. 7 is a slot 53 having arcuate sides 54 and 55 concentric with the center 14c. This slot is of sufficient angular length (20° in the embodiment shown), so as to include four dots and dashes, the number necessary to define any alphabet character.

In the operation of the Morse code educational device, disc 13 is rotatably mounted on the base element 10 as shown in FIGS. 2 and 8. Each alphabet letter in circular path 50 exhibited by the circular aperature 52 of disc 13 is defined by the particular dots and dashes in circular paths 1 exhibited by the slot 54 of disc 13. Thus, for example, as shown in FIG. 8, when the letter H is observed through circular aperture 52, four dots corresponding in the Morse code to the letter H, are observable through the slot 54. In like manner as the disc 13 is rotated with respect to the base element 10, each alphabet character is exhibited one or more times through the circular aperture 52 with its Morse code representation exhibited through the slot 54.

An advantage of my invention is the efficient ultilization of space for providing a maximum number of practice letters. This derives from the manner in which two or more alphabet letters may be derived using dots and dashes common to both. As an illustration of this operation, note that as the disc 13 is rotated 5° clockwise in FIG. 8, the letter S is observed through the circular aperture 52 and three dots corresponding in the Morse code to the letter S are observable through the slot 54. These characters include three dots previously used to form the letter H. An indication of the space saving achieved is indicated by the fact that only 44 dots and dashes are used to denot 68 alphabet letters, whereas 176 dots and dashes would ordinarily be necessary to provide these same letters.

It will be further noted in my invention that the alphabet letters do not occur in the same sequence in which they do in the alphabet. This is of advantage to the student because he does not then rely on the sequence of the letters to identify them. A further advantage of my invention is that a continuous flow of coded information is available merely by rotating the disc 13 relative to the base element 10. This is a realistic form of operation enabling the student to quickly learn the Morse code. In learning the Morse code, it is usually preferred to cover either the circular aperture 52 or slot 54 with the thumb of the student so that he may interpret the letter or code before comparing them with this device.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An educational device for teaching code signaling comprising a first disc carrying indicia representing a semaphore flag, a second disc carrying indicia representing a semaphore flag, a base member, means for rotatably mounting said first and second discs upon said base member so that said semaphore flags may be independently rotated with respect to each other in a realistic manner, said first and second discs having apertures, and indicia including the letters of the alphabet on said base member arranged to register successively with said apertures as said semaphore flags are arranged in corresponding letter sending positions.

2. An educational device for teaching code signaling comprising a first disc carrying indicia representing a semaphore flag, a second disc carrying indicia representing a semaphore flag, a base member, means for rotatably mounting said first and second discs upon said base member so that said semaphore flags may be independently rotated with respect to each other in a realistic manner, indicia including the letters of the alphabet arranged in a plurality of systematically positioned groups on said base member, said first disc having a plurality of apertures allowing at least one letter in each of a plurality of said groups on said base member exhibited through said apertures and said second disc having a single aperture allowing only a single one of said groups to be exhibited therethrough, the apertures in said first and second discs being arranged to exhibit a single letter corresponding to the letter sending position of said semaphore flags.

3. An educational device for eaching code signaling comprising a base member, indicia on said base member including the letters of the alphabet arranged in eight radial rows corresponding to the eight positions of the semaphore code, a first disc rotatably mounted upon said base member having seven apertures corresponding to seven of the eight positions of the semaphore code and carrying an indicium representing a semaphore flag in the remaining position of the semaphore code, a second disc rotatably mounted upon said first disc having an aperture adapted for successively exhibiting each of said radial rows of said base member as said second disc is moved through the eight positions of the semaphore code, and an indicium on said second disc representing a semaphore flag, the apertures in said first and second discs being arranged to exhibit a single letter corresponding to the letter sending position of said semaphore flags.

4. An educational device for teaching code signaling, a first disc carrying indicia adjacent its peripheral edge representing a semaphore flag, a second disc having a smaller diameter than said first disc carrying an indicium extending beyond its outer circular peripheral edge representing a semaphore flag, a base member, means for rotatably mounting said first and second discs upon said base member so that said semaphore flags may be independently rotated with respect to each other in a realistic manner, said first and second discs having apertures, and indicia including the letters of the alphabet on said base member arranged to register successively with said apertures as said semaphore flags are arranged in corresponding letter sealing positions.

5. An educational device for teaching semaphore code signaling comprising a base member, indicia on said base member including the letters of the alphabet located at the points of intersection of a plurality of concentric circles of different radii and eight radial lines corresponding to the eight positions of the semaphore code, a first circular disc having seven apertures each located on a different one of said radial lines and at the intersection of circles of increasing radii so that said seven apertures lie on a spiral curve, said apertures each adapted to exhibit single alphabet letters of said base member, an indicium on said first disc representing a semaphore flag adjacent the peripheral edge of said first disc and having its staff along the radial line on which no aperture is located, a second disc having a smaller diameter than said first disc and having a single aperture located along one of said radial lines adapted to exhibit all the letters in a radial row of said base member, and an indicium on said second disc representing a semaphore flag extending beyond the outer circular peripheral edge of said second disc and having its staff along the same radial line on which is located said single aperture, and means for rotatably mounting said first and second discs upon said base member so that said semaphore flags may be independently rotated with respect to each other in a realistic manner and only a single alphabet letter is exhibited corresponding to the position of the signal flags.

6. An educational device for teaching Morse code signaling comprising a base member carrying first indicia comprising alphabet letters arranged on the circumference of a first circle and second indicia comprising dots and dashes arranged on the circumference of a second circle of different diameter than said first circle, a disc rotatably mounted upon said base member having a first aperture on the circumference of said first circle and a second aperture on the circumference of said second circle, said first and second indicia and said first and second apertures being so correlated that successive alphabet letters exhibited by said first aperture are defined by successive dots and dashes exhibited by said second aperture, said indicia being so arranged that particular dots and dashes are common to more than one alphabet letter.

References Cited in the file of this patent

UNITED STATES PATENTS

| 1,229,638 | Meyers | June 12, 1917 |
| 1,311,682 | Drew | July 29, 1919 |
| 1,546,928 | Graham | July 21, 1925 |
| 1,966,971 | Rochlus | July 17, 1934 |
| 2,353,238 | Horr | July 11, 1944 |